(12) United States Patent
Marks

(10) Patent No.: US 8,864,095 B1
(45) Date of Patent: Oct. 21, 2014

(54) DEVICE FOR HANGING A FRAME ON A VERTICAL WALL

(71) Applicant: Michael A. Marks, Naperville, IL (US)

(72) Inventor: Michael A. Marks, Naperville, IL (US)

( * ) Notice: Subject to any disclaimer, the term of this patent is extended or adjusted under 35 U.S.C. 154(b) by 0 days.

(21) Appl. No.: 14/054,524

(22) Filed: Oct. 15, 2013

Related U.S. Application Data

(63) Continuation of application No. 13/309,743, filed on Dec. 2, 2011.

(60) Provisional application No. 61/420,010, filed on Dec. 6, 2010.

(51) Int. Cl.
*A47G 1/24* (2006.01)
*F16M 13/02* (2006.01)

(52) U.S. Cl.
CPC ................... *F16M 13/022* (2013.01)
USPC ........ 248/495; 248/475.1; 248/476; 248/489; 248/494; 248/323; 248/327

(58) Field of Classification Search
USPC .............. 248/466, 475.1, 476, 489, 494, 495, 248/497, 498, 323, 327, 333, 478
See application file for complete search history.

(56) References Cited

U.S. PATENT DOCUMENTS

| | | | | | |
|---|---|---|---|---|---|
| 2,681,194 | A | * | 6/1954 | Halvorsen | 248/495 |
| 2,952,431 | A | * | 9/1960 | Pedley | 248/495 |
| 4,222,544 | A | * | 9/1980 | Crowder | 248/495 |
| 4,241,510 | A | * | 12/1980 | Radecki | 33/613 |
| 5,069,411 | A | * | 12/1991 | Murphy | 248/476 |
| 5,103,573 | A | * | 4/1992 | Ehling et al. | 33/613 |
| 5,342,014 | A | * | 8/1994 | Wilson | 248/476 |
| 5,451,027 | A | | 9/1995 | McHenry | |
| 6,003,825 | A | * | 12/1999 | Abernathy, Jr. | 248/478 |
| 6,029,362 | A | * | 2/2000 | Miodragovic | 33/666 |
| 6,032,378 | A | * | 3/2000 | Null | 33/613 |
| 6,170,793 | B1 | * | 1/2001 | Clarke | 248/476 |
| 6,334,602 | B1 | * | 1/2002 | Clarke | 248/495 |
| 6,357,716 | B1 | * | 3/2002 | Kratish et al. | 248/466 |
| 6,421,928 | B1 | * | 7/2002 | Miller | 33/520 |
| 6,449,863 | B1 | * | 9/2002 | Voorhees | 33/613 |
| 6,557,813 | B1 | * | 5/2003 | Duggan | 248/476 |
| 6,739,065 | B2 | * | 5/2004 | Hofmeister et al. | 33/613 |
| 6,785,977 | B1 | * | 9/2004 | Crichton | 33/613 |
| 6,883,244 | B2 | | 4/2005 | Rimback | |
| 6,952,887 | B2 | | 10/2005 | Muchnik | |
| 6,971,184 | B2 | * | 12/2005 | Prevost | 33/613 |
| 6,978,551 | B2 | | 12/2005 | Krake | |
| 7,155,840 | B1 | | 1/2007 | Carbonaro | |
| 7,503,126 | B2 | | 3/2009 | Robins | |
| 7,797,853 | B2 | * | 9/2010 | Compton | 33/613 |
| 8,011,635 | B2 | * | 9/2011 | Aleo | 248/476 |
| 2002/0189119 | A1 | | 12/2002 | High | |
| 2006/0214080 | A1 | * | 9/2006 | de Keratry | 248/495 |

\* cited by examiner

*Primary Examiner* — Terrell McKinnon
*Assistant Examiner* — Michael McDuffie
(74) *Attorney, Agent, or Firm* — Nixon Peabody LLP

(57) ABSTRACT

A device is provided for hanging a frame member against a wall includes a crossbar and first and second vertical arms oriented perpendicular to the crossbar. The crossbar has a longitudinal track and a leveling bubble. The first and second vertical arms each have a linear track that extends along the length, and a marker on the rearward surface thereof. The vertical arms are retained to the crossbar by knuckles having a guide for slideably engaging the linear track of the vertical arms and the first vertical arms are retained perpendicular to the crossbar and are longitudinally moveable perpendicular to the linear edge.

19 Claims, 19 Drawing Sheets

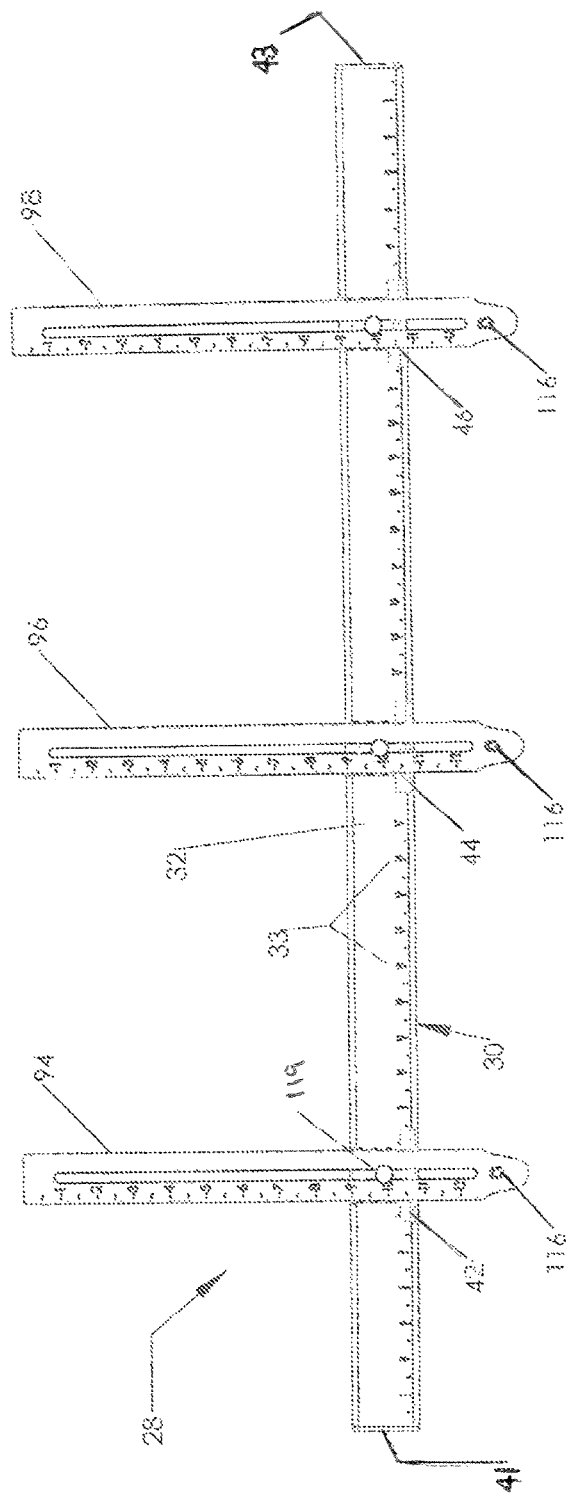

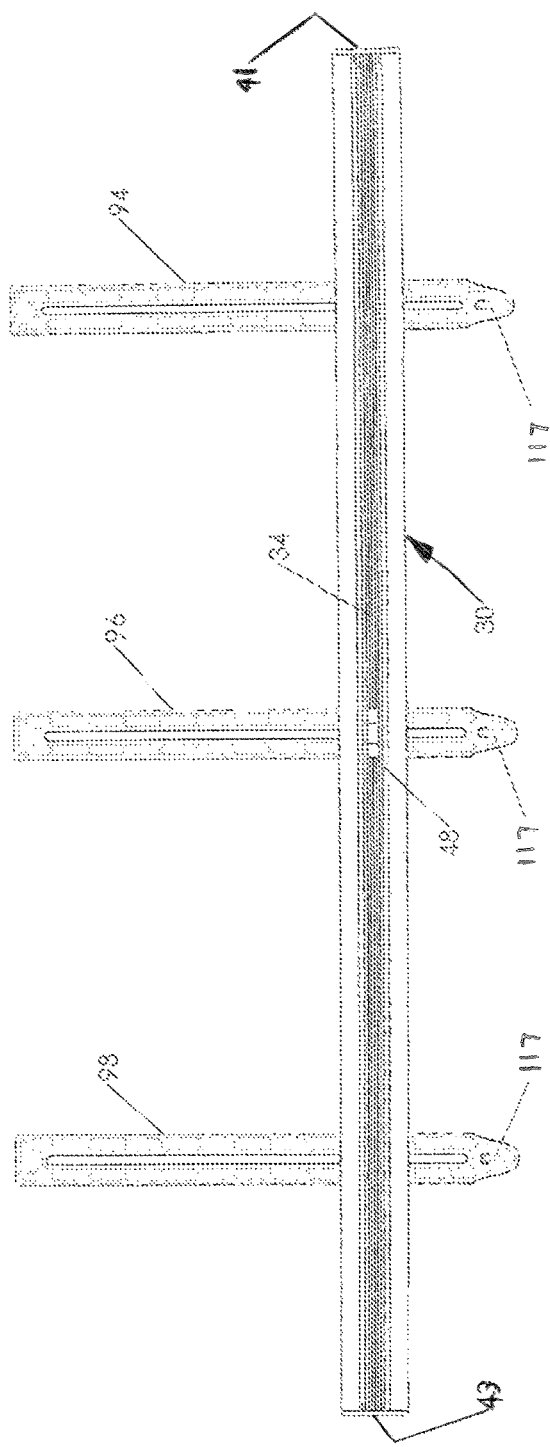

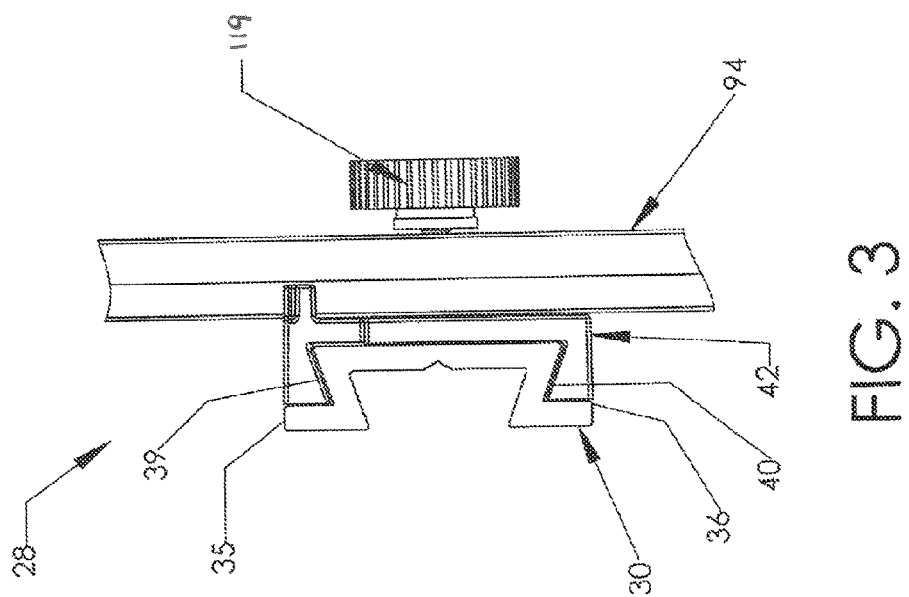

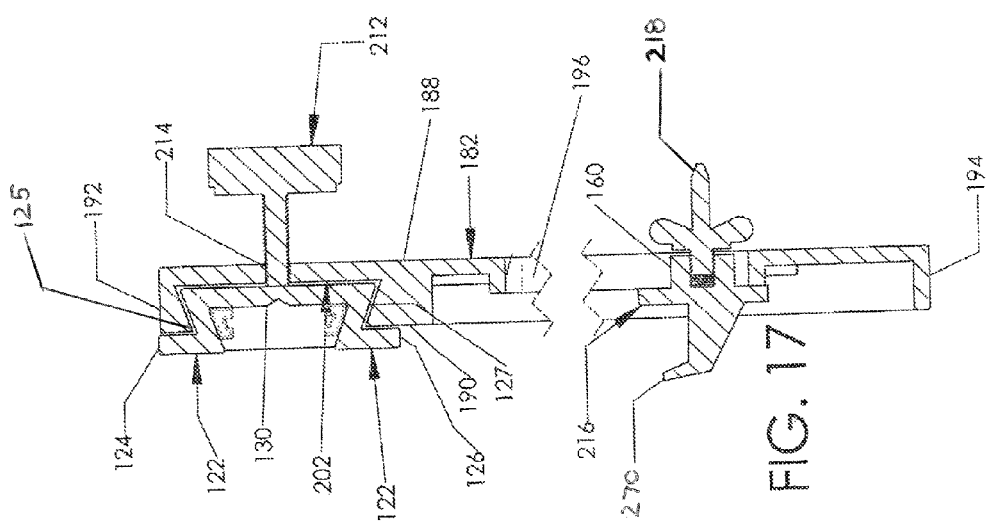

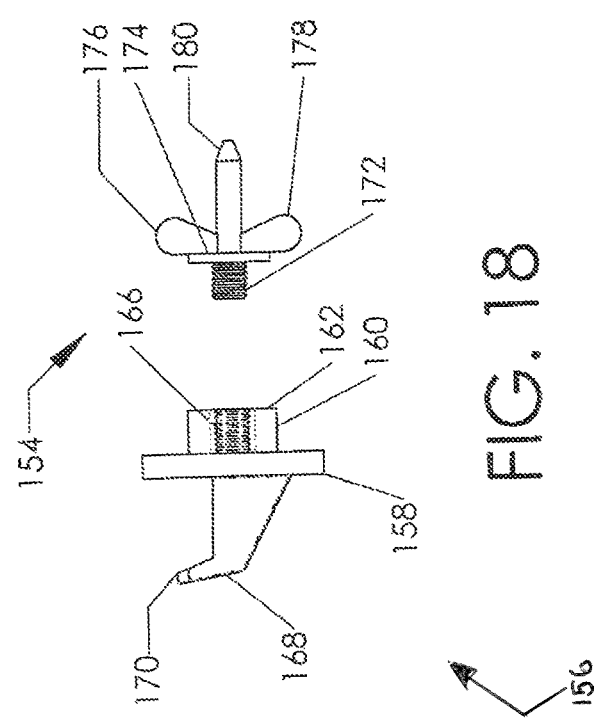

DEVICE FOR HANGING A FRAME ON A VERTICAL WALL

This application is a continuation of U.S. patent application Ser. No. 13/309,743, filed Dec. 2, 2011, which claims the benefit of U.S. Provisional Application No. 61/420,010, filed Dec. 6, 2010, each of which is hereby incorporated by reference herein in its entirety.

BACKGROUND OF THE INVENTION

The walls of a room are typically decorated by retaining a plurality of objects thereon. The decorative objects are in the form of photographs, paintings, mirrors, and the like, all of which are generally rectangular in shape. In decorating the wall, it is desirable that the various objects be positioned on the wall in an aesthetically pleasing configuration. To be aesthetically pleasing, it is desirable that rectangularly shaped wall hangings be retained with the vertical edges thereof vertical and parallel to the vertical edges of other wall hangings and to the vertical edges of the walls, and that the horizontal edges of the hangings be parallel to the horizon and parallel to the horizontal edges of other hangings.

Where a rectangular object, such as a photograph, painting, or mirror is to be retained on the wall by a plurality of retainers mounted to the rearward surface thereof, a corresponding plurality of hooks must be positioned on the wall to engage the retainers and retain the object in its desired orientation. Unfortunately, most of the retainers on the rearward surface of a object to be mounted on a wall are not positioned along a line parallel to the upper surface of the object. Accordingly, if two hooks are mounted on a wall along a horizontal with the spacings between them sufficient to engage the retainers of the frame, it is likely that once the loops on the frame are engaged to the hooks the upper and lower edges of the frame will probably not be oriented horizontally and the parallel sides of the frame will probably not be oriented vertically. In order to position a rectangular frame having a number of loops thereon against a wall, it is therefore necessary to make numerous measurements to find the proper positioning for the retaining hooks intended to retain the frame if the mounted frame is to be properly oriented. Accordingly, there is a need for a device for mounting a frame against a wall where the frame has a rear surface with a plurality of mountings thereon.

BRIEF DESCRIPTION OF THE INVENTION

Briefly, the present invention is embodied in a device for hanging a frame member against a wall where the frame member has an upper edge, a rearward surface, and two or more spaced apart retainers on the rearward surface. The device includes a crossbar and first and second vertical arms oriented perpendicular to the crossbar.

The crossbar has a longitudinal edge, a track parallel to the edge, and a leveling bubble with markings thereon that are indicative of a horizontal orientation of the longitudinal edge.

The first vertical arm has a length and a linear track that extends along the length, and a marker on a rearward surface thereof. The second vertical arm also has length, a track extending along the length, and a marker on the rearward surface thereof.

The first vertical arm is retained to the crossbar by a first knuckle having a guide for engaging the linear track of the first vertical arm wherein the length of the first vertical arm is retained perpendicular to the linear edge of the crossbar and the first vertical arm is longitudinally moveable in the direction perpendicular to the linear edge.

A second knuckle is provided for retaining the second vertical arm. The second knuckle is slideable moveable along the track of the crossbar and has a guide for engaging the track of the second vertical arm and retaining the length of the second vertical arm perpendicular to the linear edge of the crossbar. The guides of the second knuckle permit the second vertical arm to be longitudinal moveable in a direction perpendicular to the linear edge.

BRIEF DESCRIPTION OF THE DRAWINGS

A better understanding of the present invention will be had after a reading of the following detailed description taken in conjunction with the drawings wherein:

FIG. 1 is a plan front elevational view of a device in accordance with the present invention with the tracks of the various devices shown in broken lines;

FIG. 2 is a plan rear elevational view of the device shown in FIG. 1;

FIG. 3 is a fragmentary, enlarged side view of the device shown in FIG. 1 showing the knuckle retaining a vertical arm to the horizontal crossbar;

FIG. 17 is an enlarged fragmentary partially exploded cross-sectional view of the device shown in FIG. 14 taken through lines 17-17 thereof; and FIG. 18 is an enlarged exploded view of a marking member for the device shown in FIG. 14.

DETAILED DESCRIPTION OF PREFERRED EMBODIMENT

Figure 13:
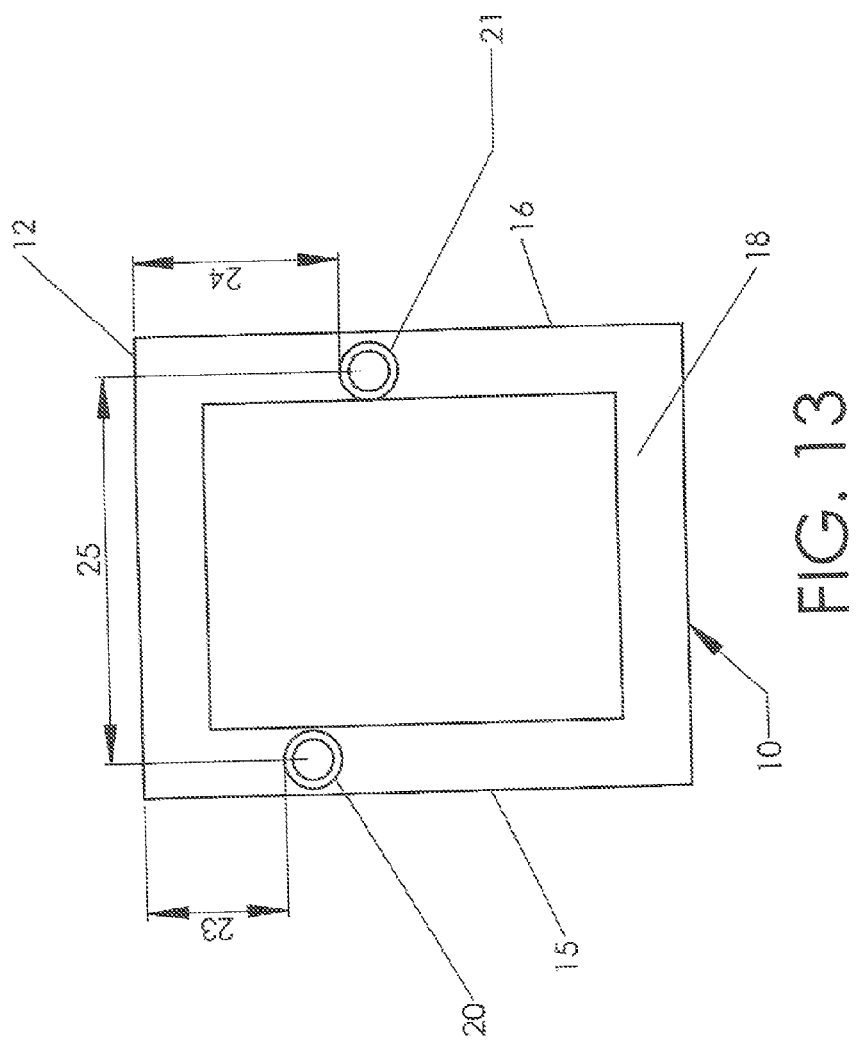
FIG. 13 is a plan view of the back side of a typical picture frame or other object to be mounted on a wall.

Referring to FIG. 13 an object 10, such as a painting, framed photo, mirror, or the like suitable for hanging on a wall may have any shape, however, most such objects are generally rectangular in shape and have a generally linear upper edge 12 and parallel spaced apart sides 15, 16. The object 10 has a rear surface 18 with one or more attachment loops 20, 21 on the rear surface suitable for retaining the object 10 against the surface of a wall. In many cases, two attachment loops are provided and two are depicted in FIG. 13. In some cases, a wire extends between the loops 20, 21 and a single hook on the wall can engage the wire to retain the object. By moving the engagement position of the wire on the hook, the object 10 can be oriented with the upper edge 12 horizontal.

On the other hand, where no wire extends between the loops 20, 21 a corresponding set of hooks, not shown, must be mounted on the wall and positioned to retain the attachment loops 20, 21. The attachment loops 20, 21, however, are generally not equally distant from the upper edge 12, that is, loop 20 is a distance 23 from the upper edge and loop 21 is a distance 24 from the upper edge, and distance 23 is not equal to distance 24. Also, the loops 20, 21 are horizontally positioned apart from one another a distance 25. The hooks that support the object 10 must therefore be positioned a distance 25 apart from one another. Also, if the object 10 is to be located with the upper edge 12 a certain distance from the ceiling or floor, the hook that receives loop 20 must be a distance 23 from the desired location of the upper edge 12, and the hook that receives loop 21 must be a distance 24 below the desired elevation of the upper edge 12. In the absence of the present invention, one must carefully record all the forgoing measurements and map their location in mirror image upon the wall before attaching the hooks that will receive the loops 20, 21 if the object 10 is to have the desired orientation.

Referring to FIGS. 1, 2, 2A and 3, to properly position the object 10 on the wall a device 28 in accordance with the present invention is provided. The device 28 includes a generally horizontal elongate rigid crossbar 30 having a forward surface 32, a rearward surface 34 and parallel opposing upper and lower sides 35, 36 and at the ends of crossbar 30 are end caps 41, 43. Dimension markings 33 are provided along one of the sides 35, 36. Preferably the dimension markings 33 designate the longitudinal center of the crossbar as the "zero" dimension, with the markings in inches (or other commonly used dimensions such as centimeters) extending incrementally towards both of the end caps 41, 43. Each of the sides 35, 36 has an elongate groove 39, 40 respectively therein, with the grooves 39, 40 forming a track for slideably receiving a plurality of knuckles 42, 44, 46 as further described below. Positioned along the rearward surface of the crossbar 30 is a level bubble 48 having markings thereon indicative of the sides 35, 36 being horizontally oriented.

Figure 8:
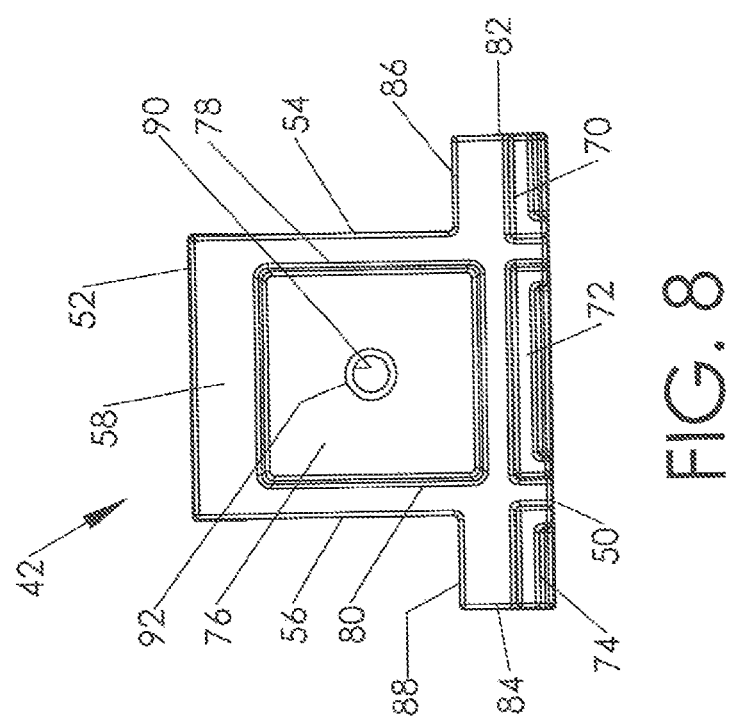
FIG. 8 is an enlarged front view of the knuckle shown in FIG. 3.
Figure 9:
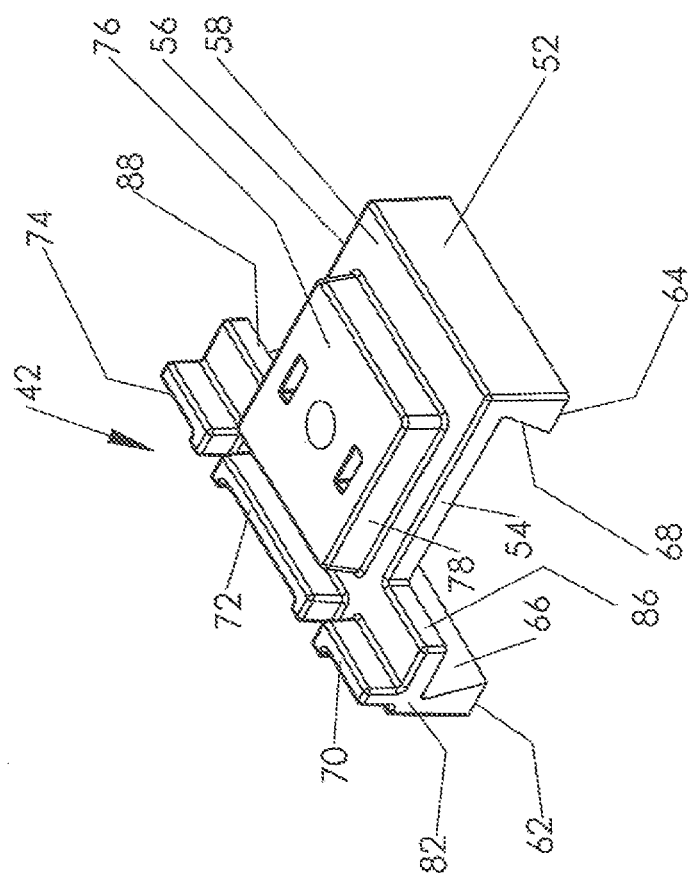
FIG. 9 is an enlarged isometric view of the knuckle shown in FIG. 8.
Figure 10:
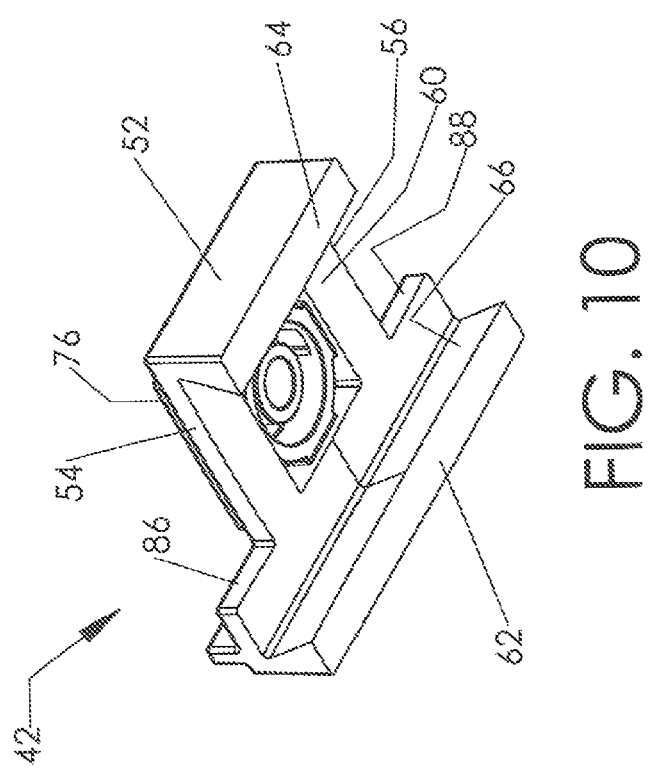
FIG. 10 is a second enlarged isometric view of the knuckle shown in FIG. 8.

Referring to FIGS. 8, 9, and 10, the knuckles 42, 44, 46 are preferably identical to one another such that knuckle 42 is representative of all three. Knuckle 42 has a generally rectangular body with an upper edge 52, a lower edge 50, parallel sides 54, 56, a forward surface 58, and rearward surface 60. Extending rearwardly of the rearward surface 60 are parallel upper and lower flanges 62, 64 with each of the flanges 62, 64 having a ramped surface 66, 68, with the surfaces 66, 68 being complementary to the surfaces of grooves 39, 40 along the sides of the crossbar 30. Accordingly, the flanges 62, 64 and surfaces 66, 68 of the knuckle 42 are received in the track formed by grooves 39, 40 and the knuckle 42 is longitudinal slideable along the track of crossbar 30.

The forward surface 58 of the knuckle 42 further has a plurality of projections thereon, with projections 70, 72, 74 extending along the lower edge 50. A fourth projection 76 is centrally located on forward surface 58 and has parallel sides 78, 80 that align with the outer ends of the central projection 72 along the upper edge 52 such that the parallel sides 78, 80 and the gaps between the projections 70, 72 and 72, 74 form a track for slideably receiving an arm as is further described below.

As best shown in FIG. 8, the lower edge 50 of knuckle 42 is longer than the upper edge 52 and shoulders 82, 84 extend outward of the sides 54, 56 to compensate for the extended length of the lower edge 50. The shoulders 82, 84 each have a linear upper edge 86, 88 that extends parallel to the upper and lower edges 52, 50 for aiding in the alignment of adjacent objects on a wall as is further described below. Finally, centrally located in the fourth projection 76 and extending through the forward and rearward surfaces 58, 60 of knuckle 42 is a transverse threaded hole 90. In the preferred embodiment, a tubular metal sleeve 92 is bonded into a transverse bore in the knuckle and the threaded hole 90 is the central opening in the sleeve 92.

Referring further to FIGS. 1 through 7, the device 28 further includes a plurality of vertically oriented elongate rigid arms 94, 96, 98, all three of which are identical to one another such that arm 94 is representative of all three. Arm 94 has a forward surface 100, a rearward surface 102, parallel linear sides 104, 106 and upper and lower ends 108, 110. An elongate slot 112 extends longitudinally through the arm 94 penetrating through the forward and rearward surfaces 100, 102 with the slot edges generally equally spaced from the sides 104, 106. Also, extending along one of the sides 104 are dimension markings 114.

Figure 2A:
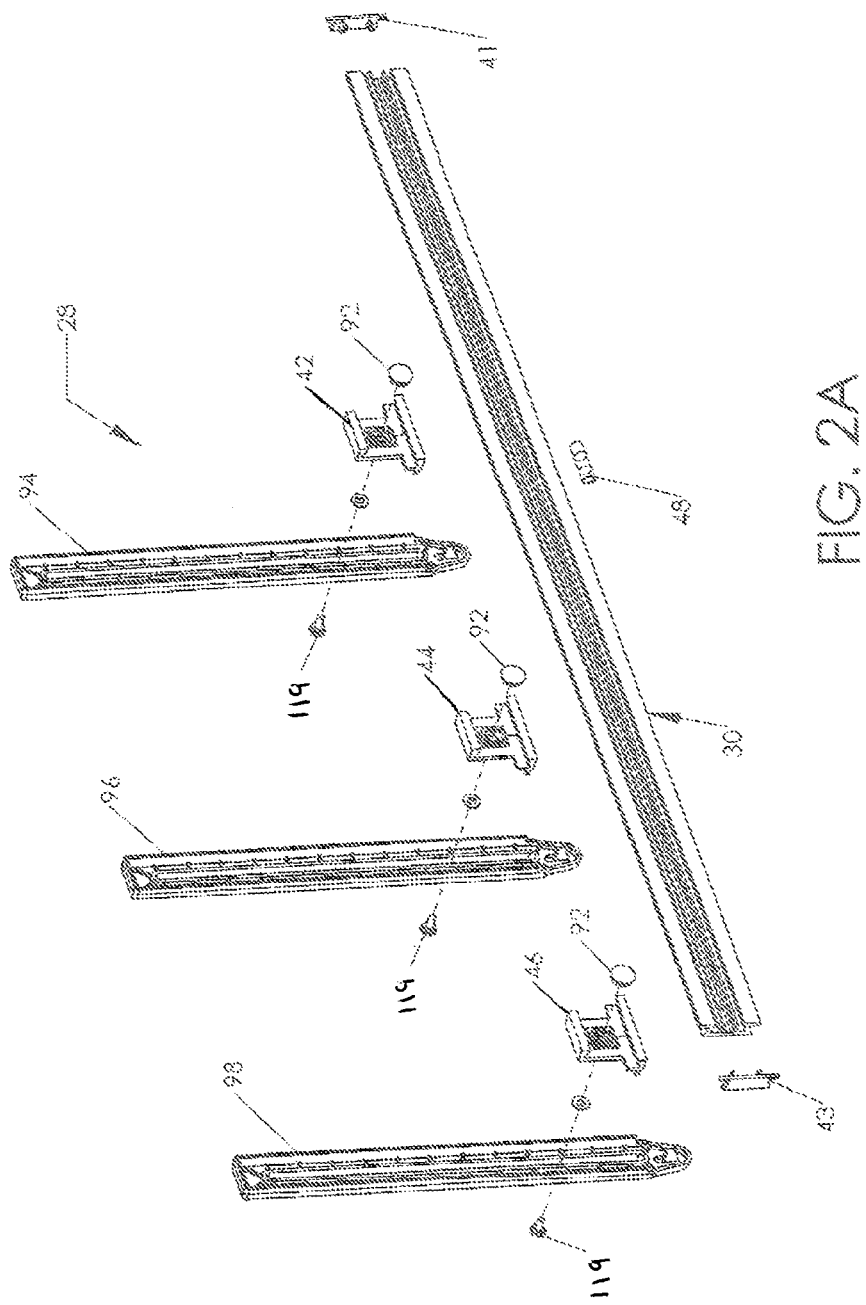
FIG. 2A is an exploded isometric view of the device shown in FIG. 1.
Figure 4:
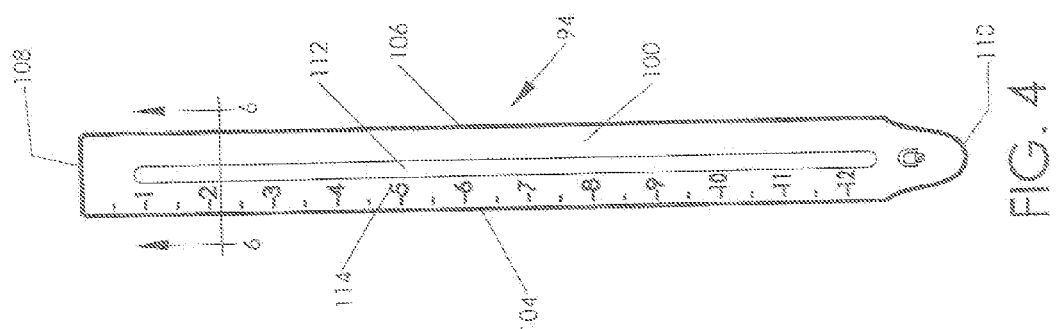
FIG. 4 is a front elevational view of one of the vertical arms.
Figure 5:
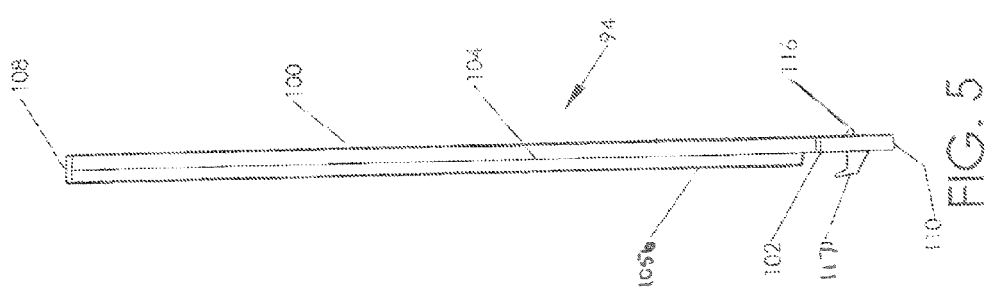
FIG. 5 is a side elevational view of the vertical arm shown in FIG. 4.
Figure 6:
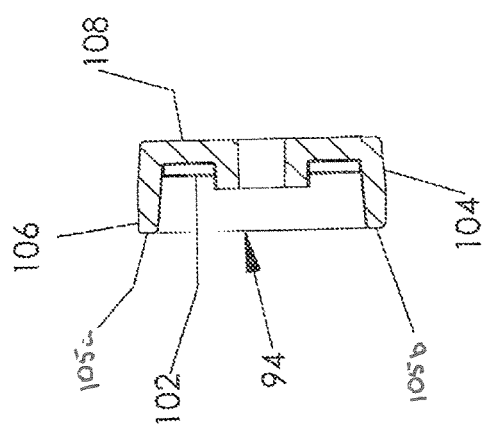
FIG. 6 is an enlarged cross-sectional view of the arm shown in FIG. 4 taken through line 6-6 thereof.
Figure 7:
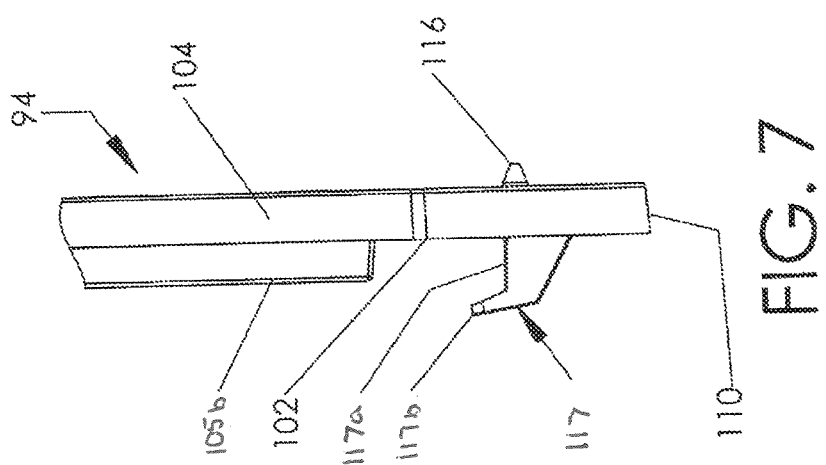
FIG. 7 is a fragmentary enlargement of FIG. 5 showing the lower end of the arm.

As best shown in FIGS. 5 and 7, extending perpendicular to the forward surface 100 of each arm 94 adjacent the lower end 110 is a metal marking pin 116, the outer end of which is generally conical in shape converging to a pointed end. Extending from the rearward surface 102 and near the lower end 110 of arm 94 is a small hook 117, having a generally planar retaining surface 117a and at the outer end of the retaining surface 117a a hook end 117b. As best shown in FIG. 7, the hook 117 is positioned such that the retaining surface 117a thereof is directly opposite the marking pin 116.

Referring to FIGS. 6, 8, 9, and 11, when seen cross-section, each of the arms 94 has a pair of rearwardly extending parallel flanges 105a, 105b that extend along the sides 104, 106, with the spacing between the flanges 105a, 105b equal to the distance between the parallel sides 78, 80 of the fourth projection 76 of the knuckle 42. The flanges 105a, 105b each has a thickness that is a little less than the distance between the adjacent projections 70, 72 and 72, 74 of the knuckles 42. Accordingly, the projections on the forward surface of the knuckle 42 are slideably receivable between the flanges 105a, 105b on the rearward surface 102 of arm 94. These parts are retained in assembled relationship by means of an adjustment thumb screw 119 that has a threaded shank 119a with threads complementary to the threaded hole 90 in knuckle 42 and having an enlarged head 119b with a diameter that is greater than the width of the slot 112. To slideably retain the arm 94 to the knuckle 42, the threaded shank 119a of adjustment screw 119 is extended through the slot 112 and into the threaded hole 90 such that the enlarged head 119b retains the arm 94 against the forward surface of the knuckle 42. The projection 76 with parallel sides 78, 80 positioned between the flanges 105a, 105b of arm 94 retains the arm 94 with the linear sides 104, 106 oriented perpendicular to the upper and lower sides 35, 36 of crossbar 30.

Figure 11:
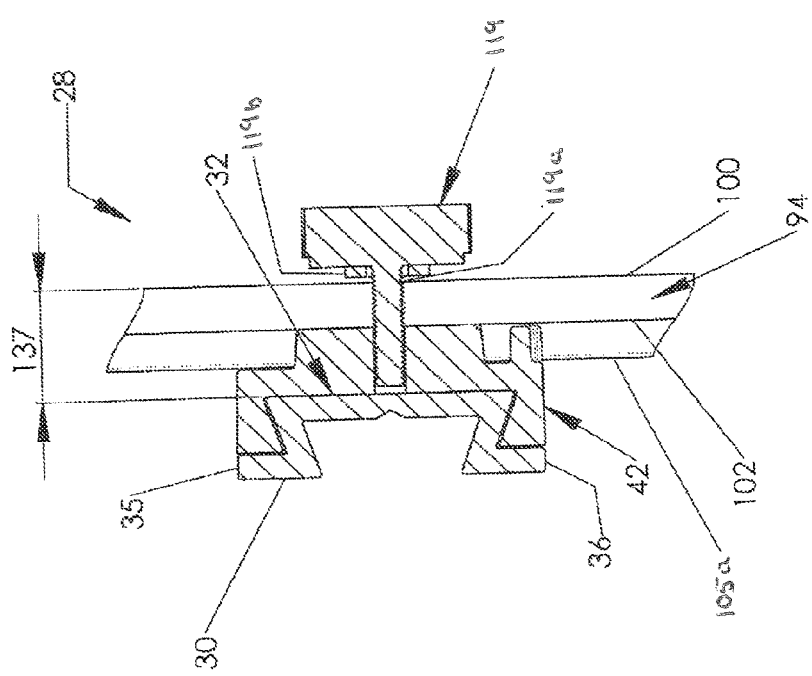
FIG. 11 is a fragmentary enlarged cross-sectional view of the parts shown in FIG. 1 taken through line 11-11 thereof.
Figure 12:
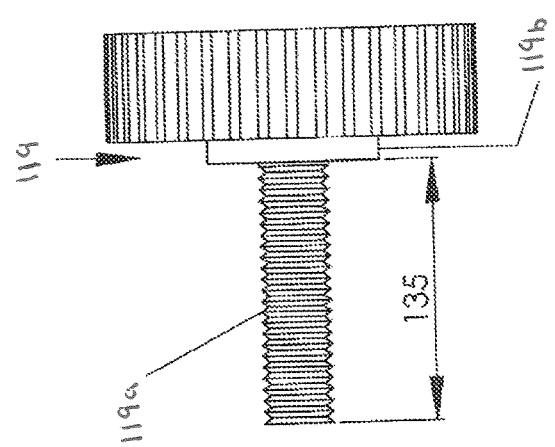
FIG. 12 is a side elevational view of the thumb screw that retains an arm and knuckle to the crossbar.

As shown in FIGS. 1, 2, 2A, 11, and 12, the device 28 is configured with three identical knuckles 42, 44, 46, with each of the knuckles retaining an associated vertically adjustable arm 94, 96, 98 all of which are identical to each other. An important feature of the invention is that the length 135 of the threaded shank 119a from the distal end thereof to the enlarged head 119b is a little longer that the distance 137 between the forward surface 100 of arm 94 and the forward surface 32 of the crossbar 30, when the parts are as shown in FIG. 11. As a result, when the screw 119 is tightened in the threaded hole 90, the distal end of the shank 119a will contact the forward surface 32 of the crossbar 30 before the enlarged head 119b tightens against the forward surface of the arm 94. When screw 119 is in its loosened condition, the knuckle 42 is slideable along crossbar 30 and the associated arm 94, 96, 98 is vertically slideable with respect to knuckle 42. Tightening screw 119 until the end of shank 119a contacts the crossbar 30 will lock the knuckle 42 with respect to the crossbar 30, but leave the associated arm 94, 96, 98 slideable with respect to the knuckle 42. Further tightening of the screw 119 will cause the distal end of the shank 119a to indent into the forward surface 32 of the crossbar 30 and will compress the enlarged head 119b against the forward surface 100 of the associated arm 94, 96, 98 thereby locking the arm 94, 96, 98 against movement with respect to the knuckle 42. Having a shank length that is a little longer than the distance between the forward surface 100 of the arm 94 and the forward surface 32 of crossbar 30 permits the parts to independently tighten down as the thumb screw 119 is turned as described above.

The device 28 as described above can thereafter be used to mount an object 10 against a wall by positioning the crossbar 30 along the upper edge 12 of the object 10 and positioning the hooks 117 of the outermost vertical arms 94, 98 to engage the attachment loops 20, 21. Once the vertical oriented arms 94, 98 have been properly aligned with respect to the object 10, the enlarged heads 119b of screws 119 for both arms 94, 98 can be tightened thereby locking the arms 94, 98 in their desired orientation with respect to the crossbar 30. Thereafter, the device 28 can be moved to a wall against which the object 10 is to be hung, without changing the orientation of any of the slideable members. The lower side 36 of the crossbar 30 is then located on the wall where the upper edge 12 of the object is to be positioned after which the points of the pins 116 are pressed against the surface of the wall leaving indentations. By inserting hooks on the wall at the indentations caused by the pins 116 the hooks inserted therein will be positioned to receive the hooks to which the loops 20, 21 can attach.

In similar fashion, the pin 116 of the center vertical member 96 can be used to engage a wire extending between the attachment loops 20, 21 to position the hook to engage the wire and retain the object 10 in the desired location on a wall. The dimensional markings 33 will aid the user to position the vertical member 96 midway between the sides 15, 16 of the object 10.

Another feature of the device 28 is that the dimensional markings 33 can be used in conjunction with the shoulder 82 on the right side of knuckle 42 as viewed in FIG. 8 and the shoulder 84 on the left side of knuckle 46 to position the side 15, 16 of one object 10 a fixed distance from the sides of a second object, such that a plurality of objects 10 can be positioned on a wall with equal spacing between objects. Similarly, the dimensional markings 114 on the arm 94, 96, 98 can be used to vertically offset a second object 10 with respect to a first object.

Referring to FIGS. 14 through 18, a second embodiment of the device 120 includes a generally horizontal elongate rigid crossbar 122 that has linear upper and lower ends 124, 126, a forward surface 128 and a rearward surface 130. Centrally positioned so that it is readable when viewing the rearward surface 130 is a level bubble 132 oriented to be centrally aligned when the upper and lower edges 124, 126 of the crossbar 122 are horizontal. The upper and lower ends 124, 126 each have angled surfaces 125, 127 therein that converge toward each other to form a track similar to the track of crossbar 30.

Extending downwardly from one end of the crossbar 122 is a fixed arm 134 having opposing linear side edges 136, 138 oriented perpendicular to the upper and lower edges 124, 126 of the crossbar 122. The fixed arm 134 further has a forward surface 140 and a rearward surface 142, and piercing through the forward and rearward surfaces 140, 142 is an elongate slot 144 having parallel slot sides that extend parallel to the side edges 136, 138. The slot 144 has an upper end 150 and a lower end 152.

Figure 16:
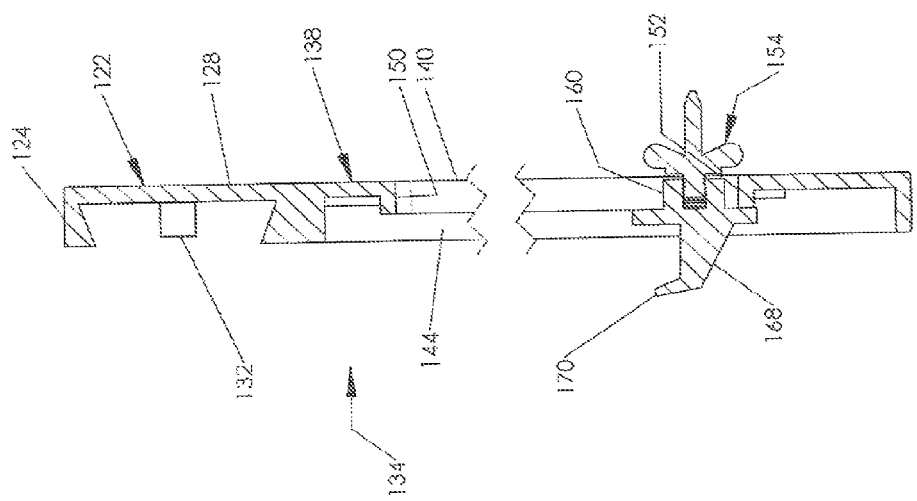
FIG. 16 is an enlarged fragmentary cross-sectional view of the device shown in FIG. 14 taken through lines 16-16 thereof.

As best seen in FIGS. 16 and 18, extending through the slot 144 in the fixed arm 134 is an adjustable marking member 154. The marking member 154 includes a metal slide member 156 that has a centrally located generally cylindrical disc 158 with forward and rearward surfaces, unnumbered. Extending from the forward surface of the disc 158 is a rectangularly shaped guide portion 160 having opposing parallel sides that are spaced apart a distance that is a little less than the distance between the slot sides such that the rectangular portion 160 will be slideably received in the slot 144 of the fixed arm 134. The forward end 162 of the guide portion 160 is planar and extending axially through the forward end is a threaded bore 166. Extending from the rearward surface of the disc 158 is a hook 168 having a hook end 170 aligned parallel to the sides of the guide portion 160.

Threadedly received in the threaded bore 166 of the guide portion 160 is a threaded shank 172, forward of which is a disc 174 having a pair of opposing thumb handles 176, 178 on the forward surface thereof. Centrally located between the thumb handles 176, 178 and extending outward of the disc 174 is a tapered marking point 180. When the rectangular guide portion 160 is fitted into the slot 144 of the fixed arm 134 with the hook 168 extending from the rearward surface 142 thereof, it will be retained in place by two discs 158, 174 which are compressed against the forward and rearward surfaces 140, 142 of the arm 134 when the threaded shank 172 is received in the complementarily threaded bore 166. When the parts are loosely retained together, the marking member 154 is slideable along the slot 144, but when the thumb handles 176, 178 are used to tightened the shank 172 into the bore 166 the position of the marking member 154 along the slot 144 will be fixed.

Referring further to FIGS. 14, 15, 17, and 18, the device 120 further includes an adjustable vertical arm 182 which has parallel opposing linear sides 184, 186, forward and rearward surfaces 188, 190 and upper and lower ends 192, 194. Extending through the forward and rearward surfaces 188, 190 and parallel to the sides 184, 186 is an elongate slot 196 having parallel slot edges (unnumbered). For simplicity of manufacture, it is desirable that the slot edges of slot 196 be spaced apart a distance equal to the spacing of the slot sides of slot 144.

As best shown in FIG. 17, near the upper end 192 the rearward surface 160 of the adjustable arm 182 has an indentation 202 having a generally linear upper edge 204 and a generally parallel linear lower edge 206. The upper edge 204 has a downwardly sloping surface 208 and the lower edge 206 has an upwardly sloping surface 210 such that surfaces 204, 206 converge toward each other with the spacings between the upper and lower edges being equal to the spacing between the sloping upper and lower edges 125, 127 of the crossbar 122. The dimensions of the indentation 202 are slightly larger than the outer dimensions of the crossbar 122 such that the surfaces 125, 127 that form a track in the crossbar 122 will be slideably received in the surfaces 208, 210 of the arm 182. The arm 182 is therefore moveable along the crossbar 122. When the adjustable arm 182 is slideably assembled on the crossbar 122, the sides 184, 186 of the adjustable arm 182 will be perpendicular to the upper and lower edges 124, 126 of the crossbar 122. A thumb screw 212 is threadedly received in a threaded bore 214 in the forward surface 188 of the adjustable arm 182 that intersects the indentation 202 such that tightening the thumb screw 212 will lock the adjustable arm 182 at a fixed location along the length of the crossbar 122.

In the preferred embodiment, the slot edges of slot 196 are spaced apart a distance equal to the distance between slot slides of slot 144. A second marking member 216 that is identical to marking member 154 is inserted into slot 196 with the marking point thereof oriented in the same direction as marking point 218 of marking member 154, and the hook end 270 thereof oriented in the same direction as hook end 170 of marking member 154.

Figure 14:
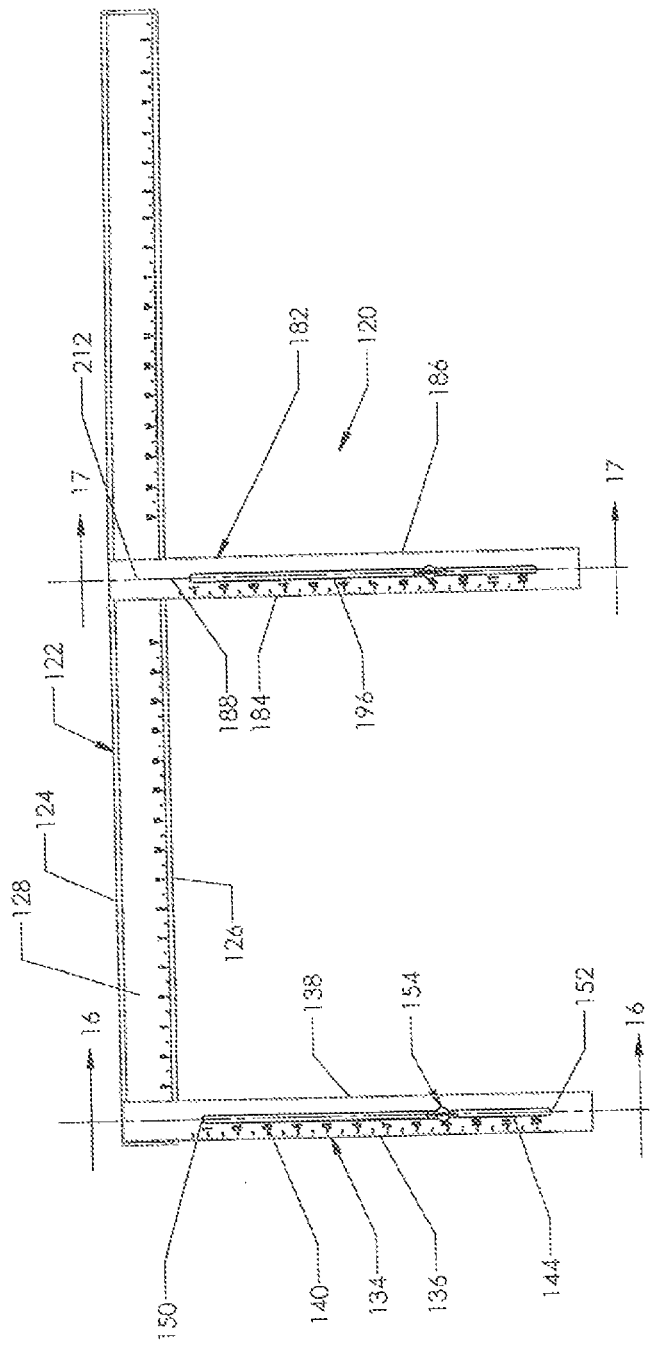
FIG. 14 is a front elevational view of a second embodiment of a device in accordance with the invention.
Figure 15:
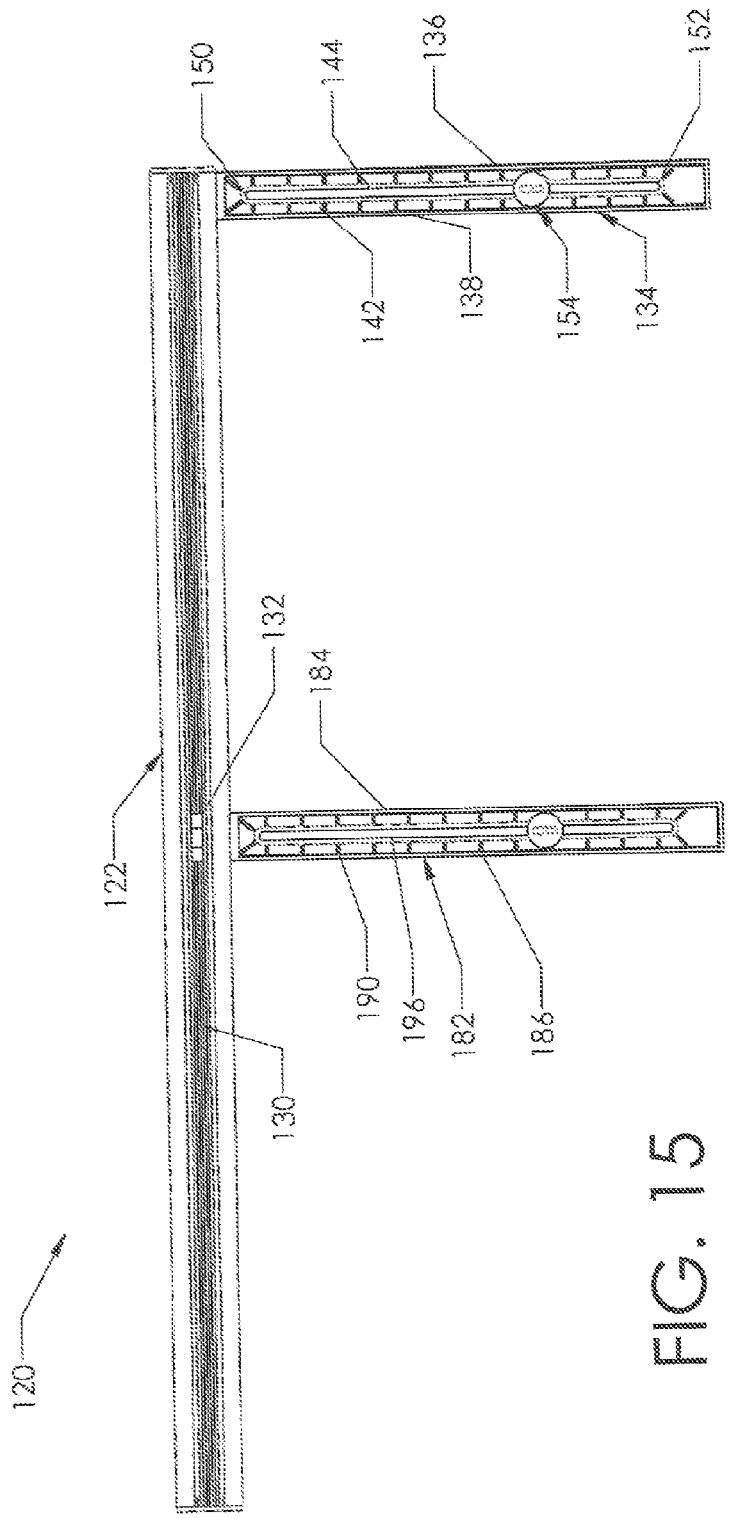
FIG. 15 is rear elevational view of the device shown in FIG. 14.

With the device 120 assembled as depicted in FIGS. 14 and 15, the adjustable arm 182 can be linearly moved along the crossbar 122 until the hook ends 170, 218 of the two marking members 154, 216 are spaced the distance between the loops 20, 21 of a object 10 to be hung on a wall. The adjustable arm 182 can be locked in place with the thumb screw 214 after which the marking members 154, 216 can be moved vertically until the hooks thereof engage the loops 20, 21 of the object 10. Thereafter the marking members 154, 216 can be locked in place by using the thumb handles 176, 178 to tighten the shank 172 into the bore 166 of each marking member. With the parts tightened, the device can be placed against the wall in a level orientation using the level bubble 132 after which the marking points 180 of the marking members 154, 216 can be used to mark the wall for receiving a mounting hook.

In the second embodiment, the device 120 is depicted as having a crossbar 122 from which extends a fixed vertical arm 134 and an adjustable vertical arm 182. It should be apparent that the fixed arm 134 could be eliminated from the device and a second adjustable arm, such as arm 182 substituted in its place. It should also be apparent that the device can be made with one adjustable arm, such as arm 182, a knuckle, such as knuckle 42, and an arm, such as arm 94 slideably received in the knuckle 42. Accordingly, there are numerous modifications and variations for the parts of the invention.

While the present invention has been described with respect to two embodiments, it will be appreciated that many modifications and variations can be made without departing from the spirit and scope of the invention. It is therefore the intent of the appended claims to cover all such modifications and variations that fall within the spirit and scope of the invention.

What is claimed:

1. A device for hanging an object on a wall, comprising:
a crossbar having a linear edge, a track parallel to the linear edge, and a level bubble with markings indicative of a horizontal orientation of the linear edge;
a first arm having a length, a track extending along the length of the first arm, and a marker pin projecting from a forward surface of the first arm;
a first knuckle slideably coupled to the track of the crossbar such that the first knuckle is moveable in a first direction, the first knuckle having a projection configured to engage the track of the first arm such that the length of the first arm is generally perpendicular to the linear edge of the crossbar and such that the first arm is configured to move along the projection of the first knuckle in a second direction generally perpendicular to the linear edge of the crossbar;
a second arm having a length, a track extending along the length of the second arm, and a marker pin projecting from a forward surface of the second arm;
a second knuckle slideably coupled to the track of the crossbar such that the second knuckle is moveable in the first direction, the second knuckle having a projection configured to engage the track of the second arm such that the length of the second arm is generally perpendicular to the linear edge of the crossbar and such that the second arm is configured to move along the projection of the second knuckle in the second direction generally perpendicular to the linear edge of the crossbar.

2. The device of claim 1, wherein the first arm further includes a hook extending from a rearward surface of the first arm generally opposite of the marker pin of the first arm.

3. The device of claim 2, wherein the second arm further includes a hook extending from a rearward surface of the second arm generally opposite of the, marker pin of the second arm.

4. The device of claim 1, further comprising:
a third arm having a length, a track extending along the length of the third arm, and a marker pin projecting from a forward surface of the third arm; and
a third knuckle slidable coupled to the track of the crossbar such that the third knuckle is moveable in the first direction, the third knuckle having a projection configured to engage the track of the third arm such that the length of the third arm is generally perpendicular to the linear edge of the crossbar and such that the third arm is configured to move in the second direction generally perpendicular to the linear edge of the crossbar.

5. The device of claim 1, further comprising a first tightening screw threadably coupled to the first knuckle and being configured to be tightened to prevent movement of the first knuckle along the track of the crossbar in the first direction.

6. The device of claim 5, wherein the first tightening screw is further configured to be tightened to prevent movement of the first arm along the projection of the first knuckle in the second direction.

7. The device of claim 1, wherein the marking pin of the first arm projects generally perpendicular from the forward surface of the first arm such that the marking pin is positioned to mark a location on the wall to receive a fastener for supporting the object and wherein the marking pin of the second arm projects generally perpendicular from the forward surface of the second arm such that the marking pin is positioned to mark a second location on the wall to receive a second fastener for supporting the object.

8. A device for hanging an object on a wall, comprising:
a crossbar including a track extending between two opposing ends of the crossbar;
a knuckle slidably coupled to the crossbar such that the knuckle is slidable in a first direction, the knuckle including a projection having a pair of parallel sides;
an arm having a marking pin projecting generally perpendicular from a forward surface of the arm, the arm being coupled to the crossbar via the knuckle such that the arm is slidable along the pair of parallel sides of the projection in a second direction; and
a thumb screw configured to selectively lock a position of the arm with respect to the crossbar, the thumb screw protruding through a slot in the arm and being threadingly engaged with a threaded hole in the knuckle.

9. The device of claim 8, further including a level bubble coupled to a rearward surface of the crossbar, the level bubble including markings indicative of a horizontal orientation of the crossbar.

10. The device of claim 8, wherein the first direction is generally perpendicular to the second direction.

11. The device of claim 8, wherein the arm further includes a hook projecting from a rearwards surface of the arm.

12. The device of claim 11, wherein the hook and the marking pin are adjacent the same end of the arm.

13. The device of claim 12, wherein the hook includes a retaining surface that is positioned directly opposite the marking pin.

14. The device of claim 8, wherein the thumb screw is configured to lock the arm in a dual stage fashion, the first stage including locking movement of the arm in the first direction and the second stage including locking movement of the arm in the second direction.

15. The device of claim 8, further comprising:
a second knuckle slidably coupled to the crossbar such that the second knuckle is slidable in the first direction, the second knuckle including a projection having a pair of parallel sides; and
a second arm having a second marking pin projecting generally perpendicular from a forward surface of the second arm, the second arm being coupled to the crossbar via the second knuckle such that the second arm is slidable along the pair of parallel sides of the projection of the second knuckle in the second direction.

16. The device of claim 15, further comprising:
a third knuckle slidably coupled to the crossbar such that the third knuckle is slidable in the first direction, the third knuckle including a projection having a pair of parallel sides; and
a third arm having a third marking pin projecting generally perpendicular from a forward surface of the third arm, the third arm being coupled to the crossbar via the third knuckle such that the third arm is slidable along the pair of parallel sides of the projection of the third knuckle in the second direction.

17. The device of claim 8, wherein the crossbar, the arm, or both include dimension markings thereon.

18. The device of claim 8, wherein the projection of the knuckle is configured to engage a track of the arm that extends along the length of the arm.

19. The device of claim 8, wherein the marking pin projects generally perpendicular from the forward surface of the arm such that the marking pin is positioned to mark a location on the wall to receive a fastener for supporting the object.

\* \* \* \* \*